United States Patent
Teng et al.

(10) Patent No.: US 11,815,450 B2
(45) Date of Patent: Nov. 14, 2023

(54) ACTIVE STABILIZATION OF PARASITIC FRINGES IN OPTICAL SPECTROMETERS

(71) Applicant: The Trustees of Princeton University, Princeton, NJ (US)

(72) Inventors: Chu C. Teng, Plainsboro, NJ (US); Gerard Wysocki, Princeton, NJ (US)

(73) Assignee: THE TRUSTEES OF PRINCETON UNIVERSITY, Princeton, NJ (US)

(*) Notice: Subject to any disclaimer, the term of this patent is extended or adjusted under 35 U.S.C. 154(b) by 0 days.

(21) Appl. No.: 17/689,579

(22) Filed: Mar. 8, 2022

(65) Prior Publication Data

US 2022/0291119 A1 Sep. 15, 2022

Related U.S. Application Data

(60) Provisional application No. 63/158,937, filed on Mar. 10, 2021.

(51) Int. Cl.
G01N 21/31 (2006.01)

(52) U.S. Cl.
CPC ..... *G01N 21/31* (2013.01); *G01N 2201/0231* (2013.01); *G01N 2201/0612* (2013.01); *G01N 2201/12* (2013.01)

(58) Field of Classification Search
None
See application file for complete search history.

(56) References Cited

U.S. PATENT DOCUMENTS

| | | | | |
|---|---|---|---|---|
| 6,044,329 | A * | 3/2000 | Kidd | G01N 21/39 356/301 |
| 6,568,597 | B2 * | 5/2003 | Krichever | G06K 19/04 235/462.23 |
| 9,273,949 | B2 * | 3/2016 | Bornhop | G01N 21/45 |
| 10,634,608 | B2 * | 4/2020 | Koulikov | G01N 21/31 |
| 2013/0243432 | A1 * | 9/2013 | McGreer | G02B 6/3548 398/49 |

OTHER PUBLICATIONS

Xiong et al., "Correlation between Optical Return Loss and Transmission Fringe Amplitude in High-index-contrast Waveguides", Conference on Lasers and Electro-Optics (OSA), pp. SW1N.5, 2017.
Marchack et al., "Reducing Line Edge Roughness in Si and SiN through plasma etch chemistry optimization for photonic waveguide applications" Proc. of SPIE, vol. 10149, pp. 101490F, 2017.
Kuramochi et al., "Disorder-induced scattering loss of line-defect waveguides in photonic crystal slabs", Phys. Rev. B 72, 161318, pp. 1-4, 2005.

(Continued)

*Primary Examiner* — Tarifur R Chowdhury
*Assistant Examiner* — Roberto Fabian, Jr.
(74) *Attorney, Agent, or Firm* — MEAGHER EMANUEL LAKS GOLDBERG & LIAO, LLP

(57) ABSTRACT

Disclosed are a system and method for active stabilization of parasitic fringes in optical spectrometers, wherein the spectrometer obtains the transmission spectrum, and a signal processor extracts the etalon drift from the spectral signatures of parasitic fringes. The disclosed approach improves spectrometer accuracy, minimizes drift, and increases time between calibrations.

27 Claims, 7 Drawing Sheets

(56) References Cited

OTHER PUBLICATIONS

Teng et al., "Fiber-Pigtailed Silicon Photonic Sensors for Methane Leak Detection", Conference on Lasers and Electro-Optics, OSA, pp. AM3B.2, 2017.

Teng et al., "Dynamic Optical Fringe Suppression for Silicon Photonic Sensors", Conference on Lasers and Electro-Optics, OSA, pp. SW3L.7, 2018.

Zhang et al., "Adaptive etalon suppression technique for long-term stability improvement in high index contrast waveguide-based laser absorption spectrometers", Electronics Letters, vol. 55, pp. 851-853, 2019.

Tombez et al., "Methane absorption spectroscopy on a silicon photonic chip", Optica, vol. 4, No. 11, pp. 1322-1325, Nov. 2017.

Yoshino et al., "Fiber-optic Fabry-Perot interferometer and its sensor applications", IEEE J. Quantum Electronics, vol. QE-18, No. 10, pp. 1624-1633, Oct. 1982.

Xiao et al., "Monitoring changes in the refractive index of gases by means of a fiber optic Fabry-Perot interferometer sensor", Sensors Actuators A Physical, Vo. 118, pp. 177-182, 2005.

Green et al., "Silicon Photonic Gas Sensing", Optical Fiber Communications Conference and Exhibition, OFC 2019—Proceedings, 2019.

Dwivwdi et al., "Experimental Extraction of Effective Refractive Index and Thermo-Optic Coefficients of Silicon-on-Insulator Waveguides Using Interferometers", Journal of Lightwave Technology, vol. 33, No. 21, pp. 4471-4477, Nov. 1, 2015.

Pruessner et al., "Thermo-optic tuning and switching in SOI waveguide Fabry-Perot microcavities," Optics Express, vol. 15, No. 12, pp. 7557-7563, Jun. 11, 2007.

Silver, "Frequency-modulation spectroscopy for trace species detection: theory and comparison among experimental methods", Applied Optics, vol. 31, No. 6, pp. 707-717, Feb. 20, 1992.

Lins, et al., "Simulation-based comparison of noise effects in wavelength modulation spectroscopy and direct absorption TDLAS", Appl. Phys. B, vol. 100, pp. 367-376, 2010.

\* cited by examiner

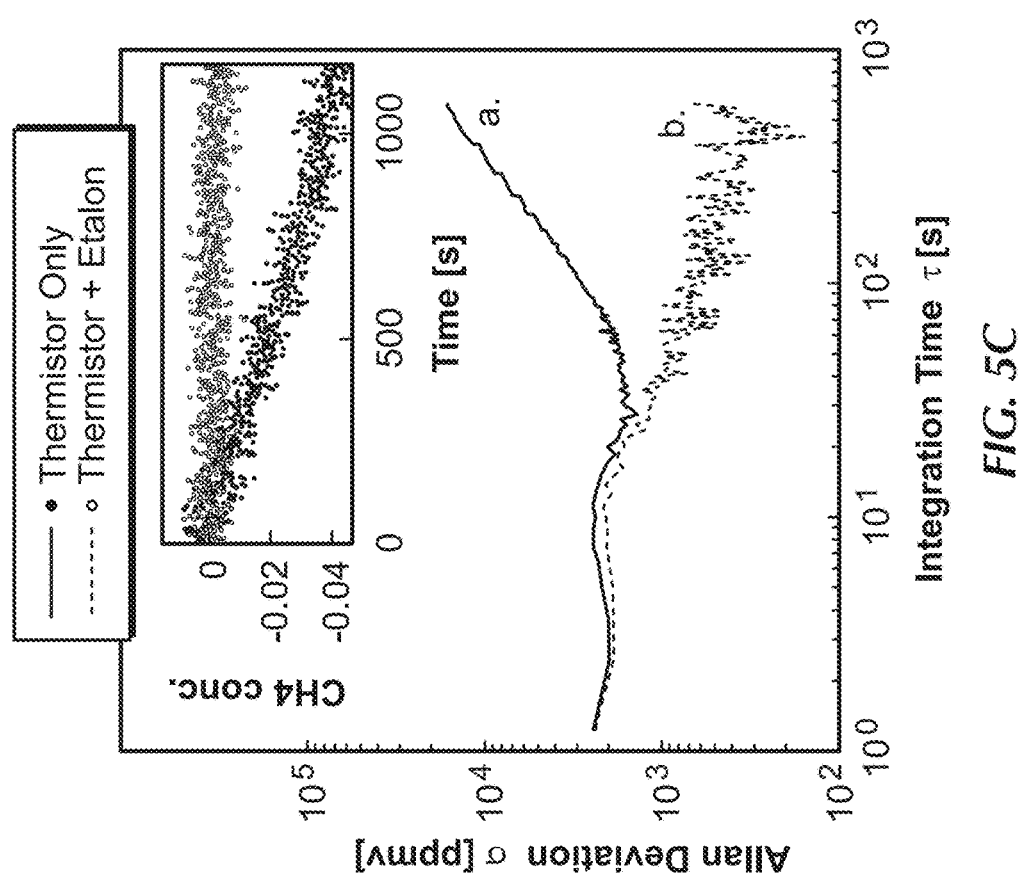
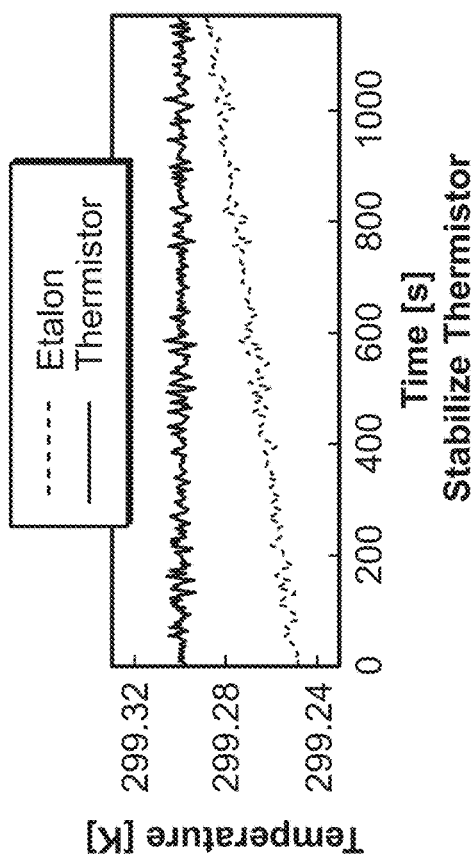
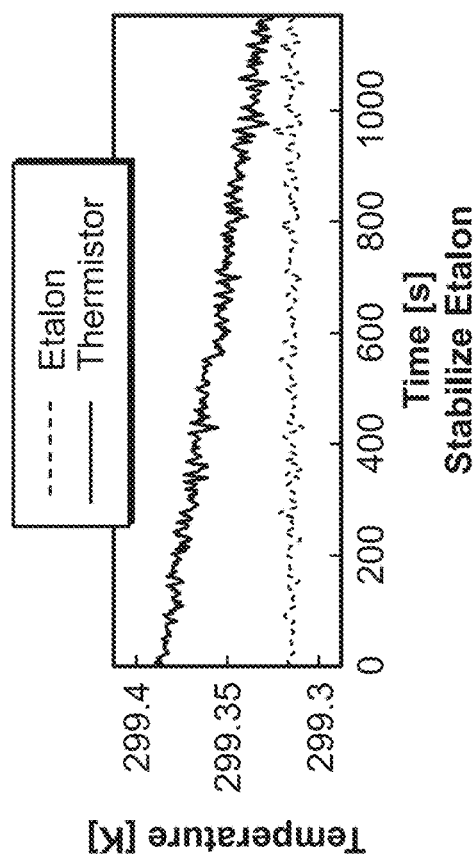
FIG. 5A
FIG. 5B
FIG. 5C

ACTIVE STABILIZATION OF PARASITIC FRINGES IN OPTICAL SPECTROMETERS

CROSS-REFERENCE TO RELATED APPLICATIONS

This application claims priority to provisional application 63/158,937, filed on Mar. 10, 2021, which is herein incorporated by reference in its entirety.

BACKGROUND

Parasitic fringe drift from unwanted scatterings has been a persistent problem in the field of optical spectroscopy that limits the long-term stability of optical spectrometers, yet their spectral features provide relevant information that can be used to improve the performance of spectrometers. A technique that enables accurate measurement of etalon drift, which is critical to etalon stabilization, is therefore useful and desirable.

BRIEF SUMMARY

The present disclosure provides a system and method for active stabilization of parasitic fringes in optical spectrometers, wherein the spectrometer obtains the transmission spectrum, and a signal processor extracts the etalon drift from the spectral signatures of parasitic fringes. More particularly, disclosed is a process for etalon stabilization in optical spectrometers to improve spectrometer accuracy, minimize drift, and increase time between calibrations. Disclosed is the incorporation of in situ etalon drift measurement based on spectral analysis of the parasitic fringes instead of relying on conventional secondary parameter sensors such as pressure or temperature sensors.

While temperature stabilization is disclosed as a proof-of-concept demonstration, it should be understood that the process is applicable to fringe stabilization using other means including but not limited to opto-mechanical transducers, pressure control etc. In a disclosed example, two schemes of operation are introduced: the first is an augmented conventional setup for closed-loop temperature stabilization with minimal hardware change to a conventional actively temperature stabilized system, and the second is a more general setup for fringe stabilization that can adapt to different etalon control mechanisms. Details of the operating procedures are described below.

BRIEF DESCRIPTION OF THE DRAWINGS

FIG. 5A depicts conventional TEC temperature stabilization using a thermistor.

FIG. 5B depicts temperature stabilization using the etalon phase for temperature retrieval.

FIG. 5C depicts a comparison of spectrometer stabilization of a silicon photonic waveguide methane sensor using two schemes: conventional TEC temperature stabilization using a thermistor (red) and augmented temperature stabilization using etalon phase retrieval (grey).

DETAILED DESCRIPTION

Figure 1:
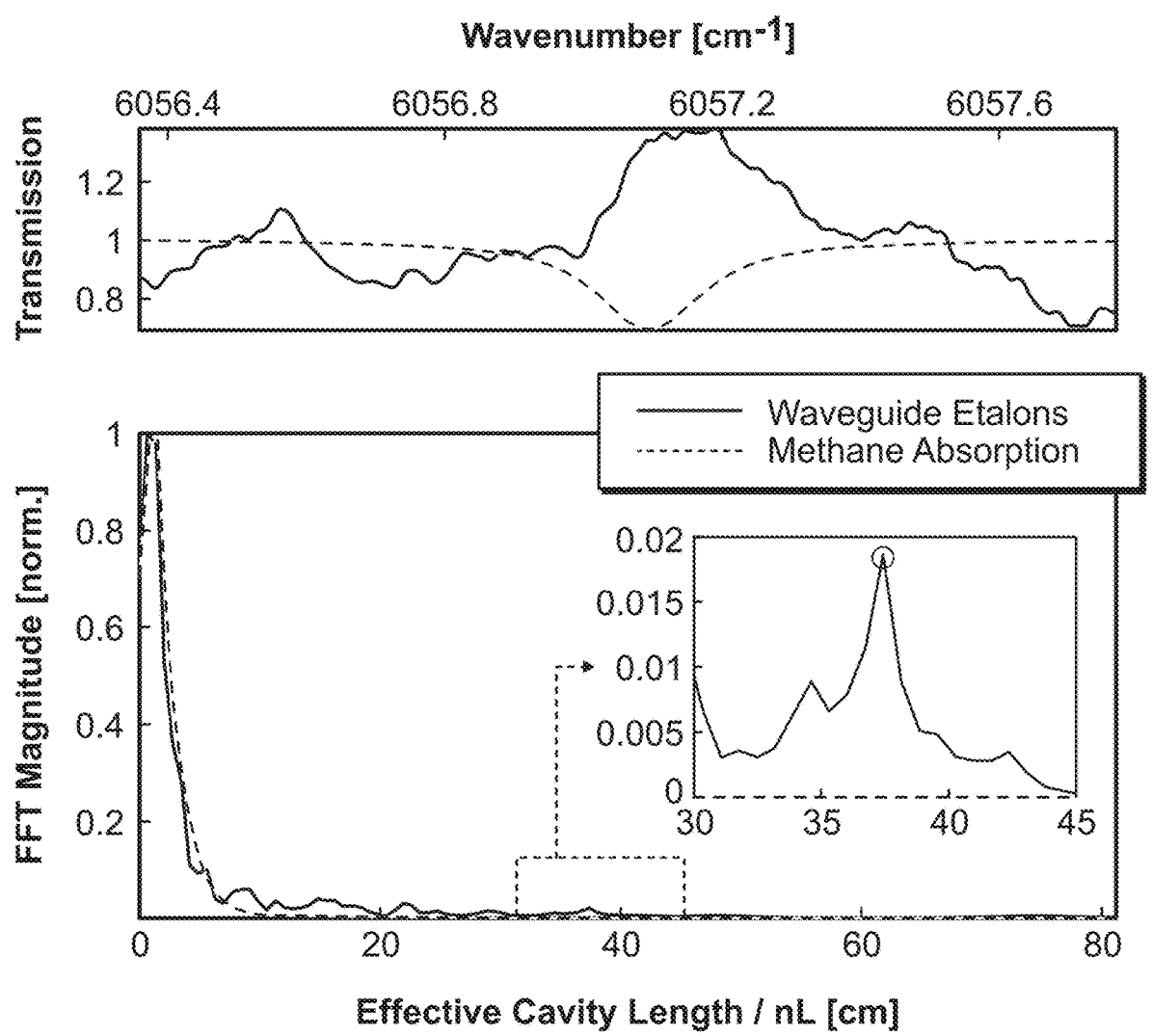
FIG. 1 depicts etalon phase tracking via Fast Fourier Transform of the measured optical spectrum used for more accurate sensor temperature retrieval.

Parasitic fringe (etalon) drift has been a persistent problem in the field of optical spectroscopy that limits the long-term stability of the spectrometer. The disclosed approach enables accurate measurement of etalon drifts, which is critical to etalon stabilization.

An immediate application as demonstrated experimentally is the stabilization of silicon photonic waveguide sensors through the disclosed method (see below for an experimentally verified application). These integrated sensors are extremely susceptible to etalon fringe drift due to stochastic line-edge roughness and high thermo-optic coefficients, hence precise fringe stabilization is critical for achieving low drift in these spectrometers. Since thermal effects are dominating in these devices, stabilization of parasitic fringes through etalon phase retrieval followed by thermal correction directly contributes to improved performance of the spectroscopic system.

While the disclosed technology was demonstrated on the silicon photonic waveguide platform, it can be applied in all cases where optical fringing is an issue, including any optical spectrometer. For example, it can be generally applied to any optical spectrometers that suffer from interference fringes including spectrometers based on free-space optics.

Parasitic fringes or etalons are created by unwanted feedbacks in the optical system and they exhibit spectral features that may not be easily isolated from the spectroscopic signal. The minimization and/or stabilization of these etalons is critical to the sensitivity and accuracy of the spectrometer. In general, etalon drift results from variations of optical length between optical interfaces that contribute to etalon formation (due to reflection and/or scattering). The optical length can be affected by temperature fluctuations through 1) thermal expansion, which affects the relative position of optical surfaces, and/or 2) the thermal-optic effect, which changes in the refractive index of the medium where the etalon occurs. Alternatively, opto-mechanical changes (e.g., due to pressure, vibration etc.) in the physical length or orientation of interfaces forming the etalon can also affect stability of parasitic fringes.

As also discussed elsewhere herein, parasitic fringes can be affected by many parameters of the spectroscopic system. Perhaps most common is temperature, which causes thermal expansion of the spectrometer which in effect causes the parasitic fringes to drift. However, mechanical stress or strain due to vibration, mechanical shifts, changes in pressure around the spectrometer could also result in fringe drift, which could be stabilized by using actuators counter-acting those causes. Exemplary parameters include temperature, pressure, opto-mechanical position, electrical current or optical power (electrical current and optical power may include less typical cases where any part of the spectrometer exhibiting parasitic fringes is controlled by electrical current or light, and those parameters would cause spectral shift of the parasitic fringes).

Since interference fringing is a common concern for many spectrometers, there has been a variety of sophisticated techniques developed for fringe mitigation and stabilization. In the hardware domain, one can reduce unwanted scatterings for example through improved fabrication or mechanically dither the fringes so that random fringe fluctuations can be incoherently averaged out. The former is time consuming and challenging to implement, and the latter is effective to some extent only under specifically designed systems. In the signal processing domain, one can try to account for spectral features due to fringes through nonlinear regression or other adaptive signal processing techniques. These methods are often based on heuristic models whose efficacy is unpredictable.

Many spectroscopic systems are designed to minimize thermal or opto-mechanical drifts of parasitic fringes in the system (e.g., by incorporating vibration isolation, pressure-controlled pressure vessels enclosing the system, or temperature stabilized enclosures). If the system stabilization is performed in an active way, it is usually focused on stabilization of parameters such as temperature and pressure that are suspected to cause etalon fringe drift. For example, conventional methods of system temperature stabilization use a temperature sensor (e.g., thermistor) to detect temperature fluctuations in the device under test (DUT), then provide closed-loop feedback to a heating/cooling element (e.g., thermoelectric cooler) that directly effects temperature of the DUT. Such stabilization can be used at the system level (e.g., optical breadboard is temperature stabilized via heating elements), or at the device level (e.g., an integrated photonics spectrometer on a chip can be placed on a thermoelectric cooler for temperature stabilization). In any of these cases, the stabilization is indirect because a secondary parameter (e.g., temperature or pressure) instead of the actual drift of parasitic fringes is used as the error signal. The disclosed approach addresses the root cause of fringe noise by directly measuring and stabilizing the etalon drift.

Figure 2:
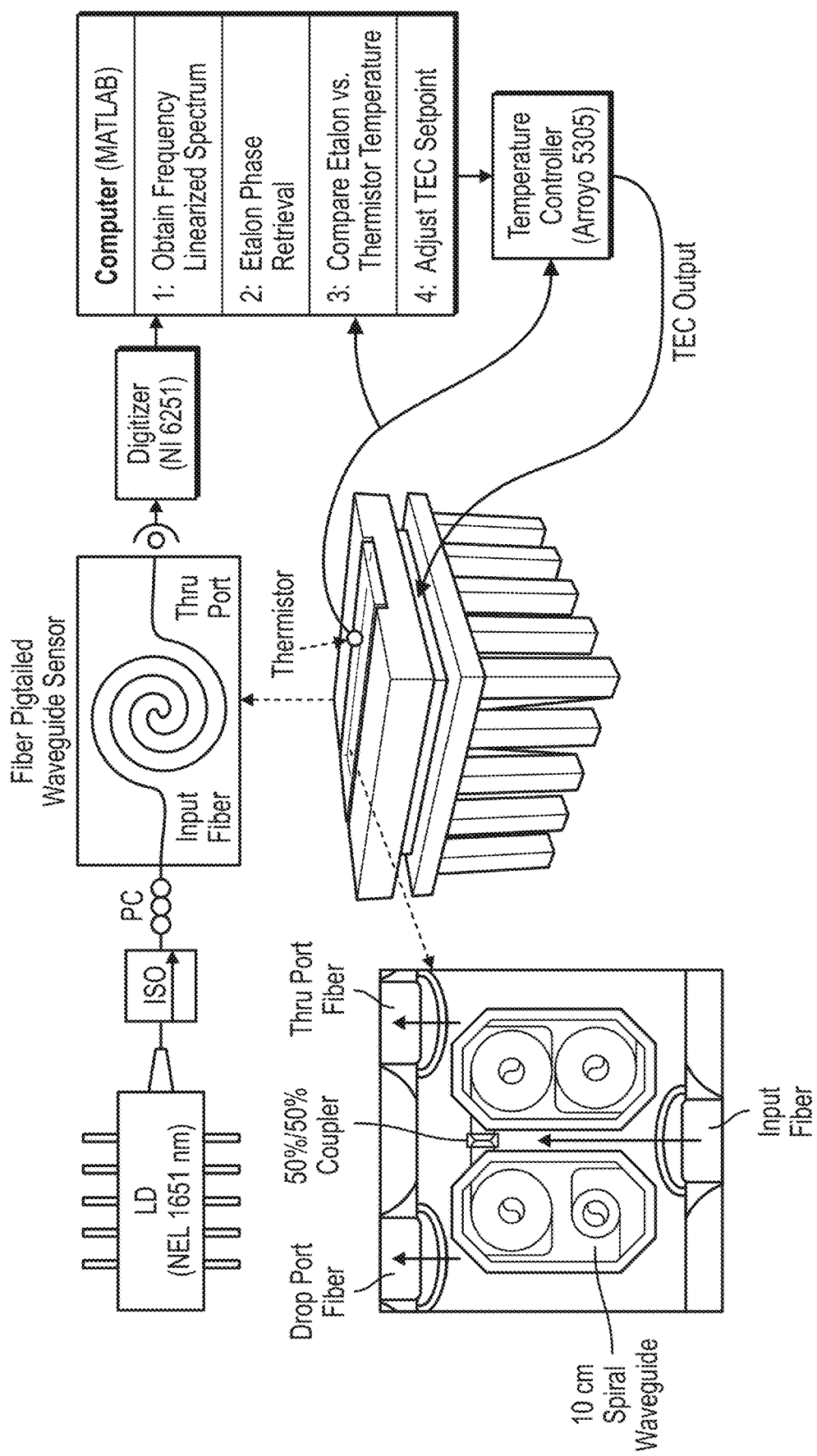
FIG. 2 depicts a temperature control experiment setup for testing of the waveguide sensor thermal stability.
Figure 3A:
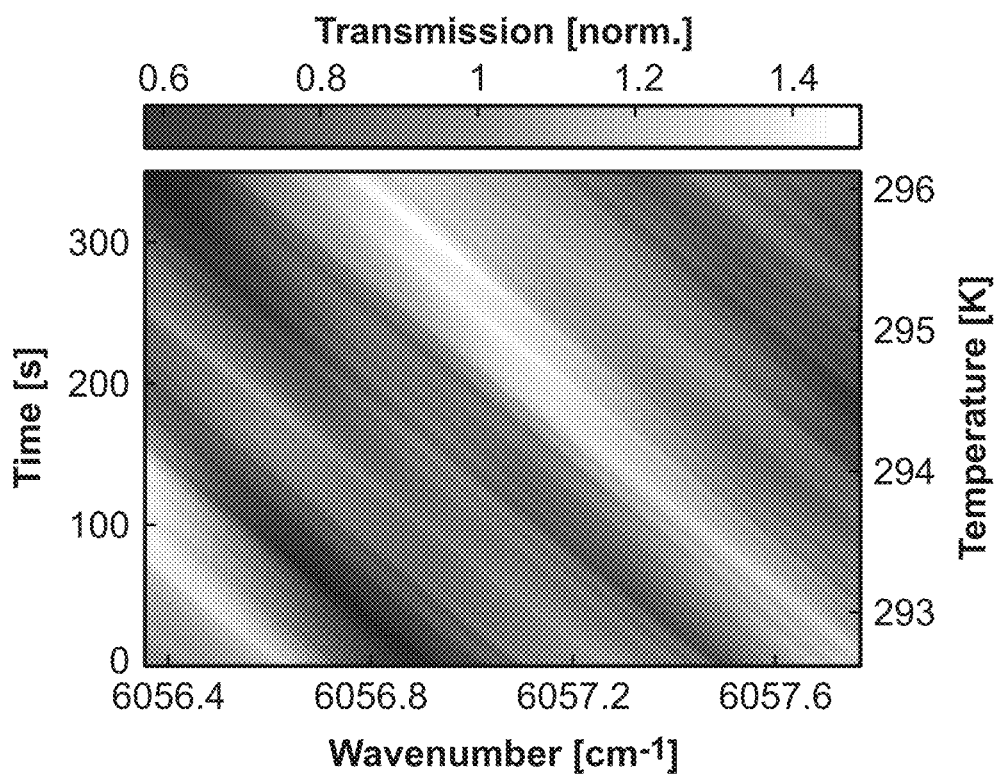
FIG. 3A depicts a cascade of zero-gas spectra continuously acquired during the temperature tuning experiment.
Figure 3B:
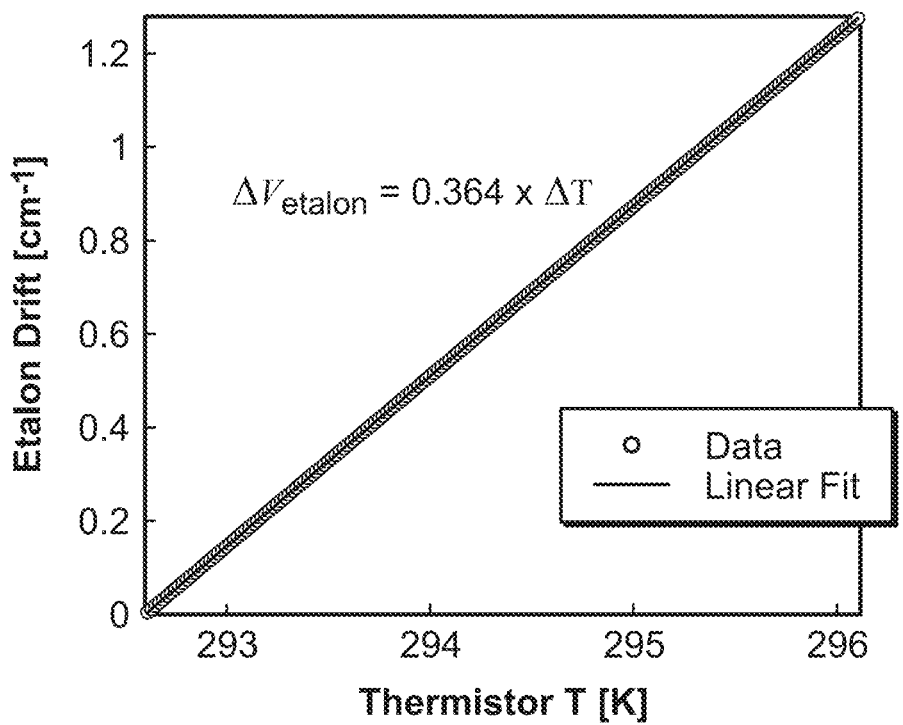
FIG. 3B depicts calibration of etalon drift against an on-chip thermistor.
Figure 4:
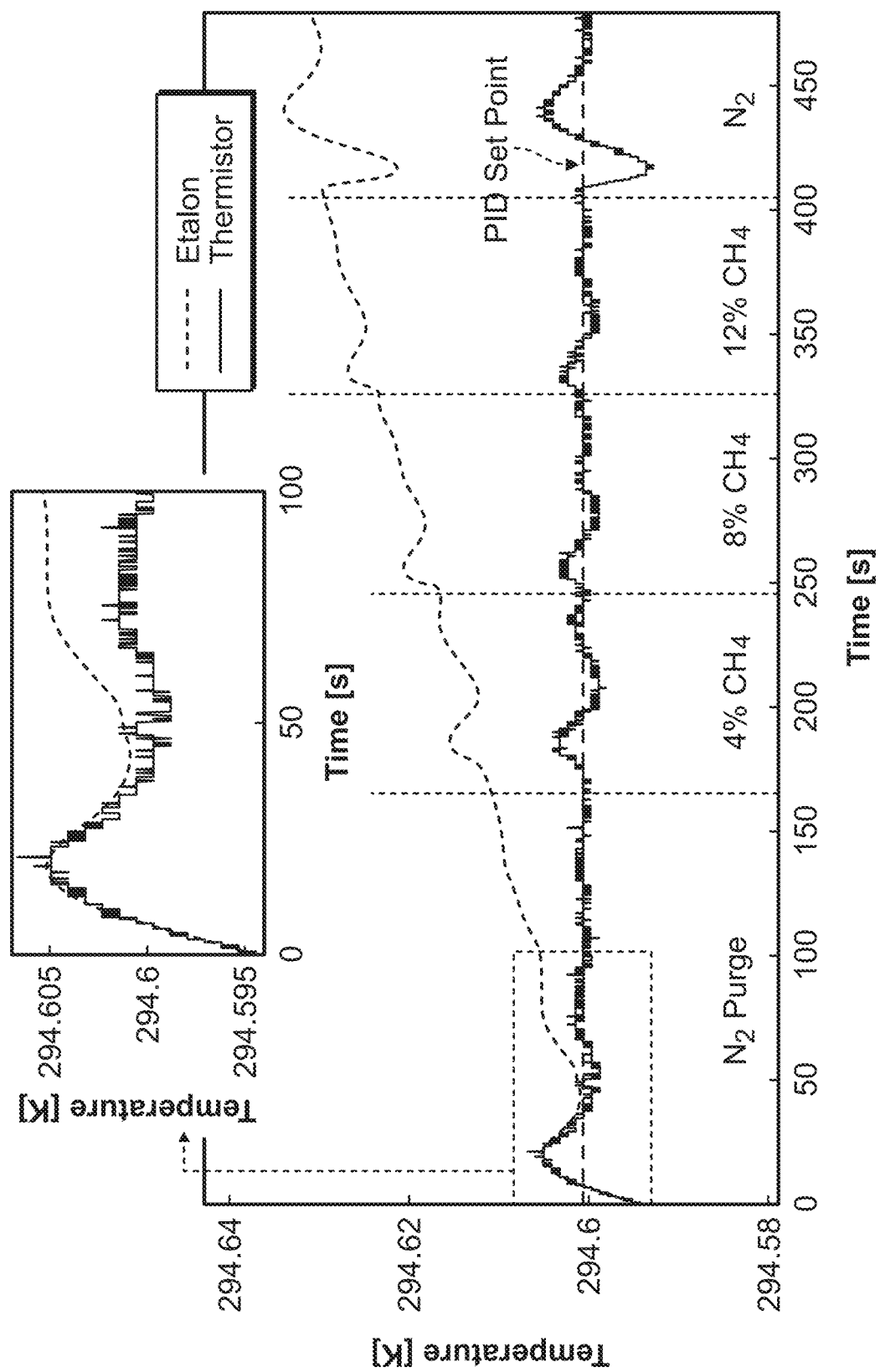
FIG. 4 depicts temperature retrieval with the sensor exposed to a controlled flow of methane in nitrogen mixture.
Figure 6A:
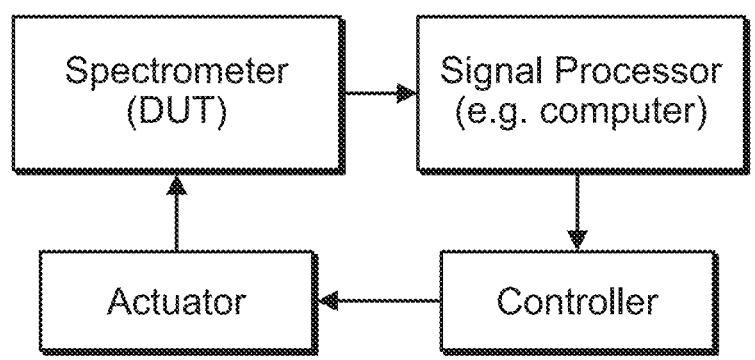
FIG. 6A depicts an embodiment of the process of stabilization of parasitic etalon fringes that assumes the entire spectrometer is stabilized (e.g., thermally).
Figure 6B:
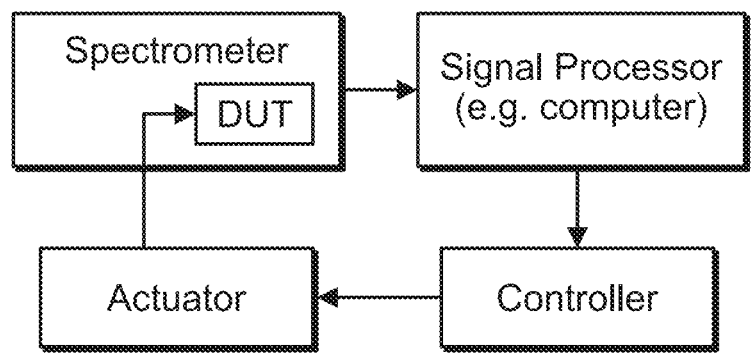
FIG. 6B depicts an embodiment of the process of stabilization of parasitic etalon fringes that assumes only part/component/sub-system of the spectrometer is stabilized.
Figure 7A:
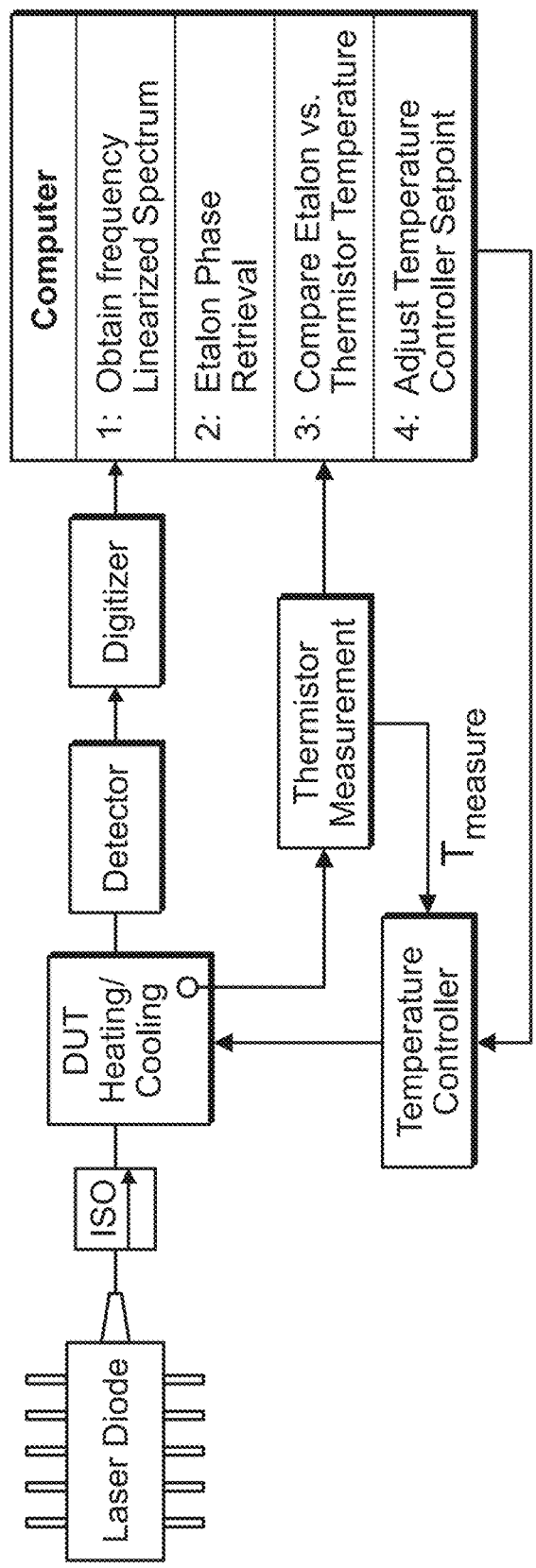
FIG. 7A depicts an implementation of fringe stabilization based on etalon phase retrieval wherein the control loop leverages a conventional temperature stabilization using a thermistor augmented with additional adaptive correction to the set-point based on etalon fringe drift.

Further details are shown in the Figures. FIG. 1 depicts etalon phase tracking via Fast Fourier Transform of the measured optical spectrum used for more accurate sensor temperature retrieval. At the top of FIG. 1, a zero-gas spectrum (black) demonstrating spectral fringe contamination is shown along with a methane absorption profile simulated for a 40% methane mixture in nitrogen at 1 atm pressure for a 10 cm waveguide sensor operating in TM mode (red dashed). At the bottom of FIG. 1 is depicted Fast Fourier transform (FFT) of the zero-gas spectrum and the simulated methane spectrum shown above; the FFT magnitudes are normalized for convenient comparison. An etalon with the smallest interference from the methane spectrum is identified at nL=38 cm, and the position of etalon phase tracking is marked in the zoomed-in figure. FIG. 2 depicts a temperature control experiment setup for testing of the waveguide sensor thermal stability. Procedures for enhanced thermal control of the waveguide is also illustrated. LD is shorthand for a butterfly mounted laser diode; ISO is shorthand for a fiber-coupled isolator; and PC is shorthand for a fiber-coupled polarization controller. FIG. 3 depicts thermally induced waveguide etalon drift. FIG. 3(a) depicts a cascade of zero-gas spectra continuously acquired during the temperature tuning experiment. FIG. 3(b) depicts calibration of etalon drift against an on-chip thermistor. As the TEC setpoint is linearly tuned from 292 K to 296 K, a linear relationship between etalon drift and the thermistor-measured temperature is observed. FIG. 4 depicts temperature retrieval with the sensor exposed to a controlled flow of methane in nitrogen mixture. As chip stabilization is performed using thermistor measurements only, a linear drift is observed in temperature retrieved through etalon phase tracking. A magnified plot of the first 100 s of measurement is also shown. While thermistor-based measurement is limited by 1 mK resolution, at least an order of magnitude better resolution is obtained using etalon-based temperature retrieval. FIG. 5 depicts the comparison of temperature stability for two SPWAS stabilization schemes: FIG. 5(a) depicts conventional TEC temperature stabilization using a thermistor. FIG. 5(b) depicts temperature stabilization using the etalon phase for temperature retrieval. FIG. 5(c) depicts a comparison of spectrometer stabilization of a silicon photonic waveguide methane sensor using two schemes: conventional TEC temperature stabilization using a thermistor (red) and augmented temperature stabilization using etalon phase retrieval (grey). With nitrogen flowing through the system, spectroscopic retrieval of zero-gas methane concentration was performed. Allan deviation plot is calculated for the two concentration traces shown in the inset. FIG. 6 depicts a schematic diagram of the process of stabilization of parasitic etalon fringes. FIG. 6(a) depicts an embodiment that assumes the entire spectrometer is stabilized (e.g., thermally). FIG. 6(b) depicts an embodiment that assumes only part/component/sub-system of the spectrometer is stabilized. "DUT" is an acronym for device under test. FIG. 7 depicts implementations of fringe stabilization based on etalon phase retrieval. In systems where optical feedback or etalons are prevalent, the installation of an optical isolator is generally beneficial hence it is included in this schematic. "Iso" is shorthand for optical isolator.

More particularly, parasitic fringe drift from unwanted scatterings limits the long-term stability of waveguide-based optical spectrometers. Yet their spectral features provide relevant information that can be used to improve performance of the spectrometer. The method and system disclosed herein allows parasitic fringe drift to be extracted and utilized to perform accurate thermal stabilization to achieve better overall stability of the spectrometer, e.g., in the case of integrated waveguide sensors. In an exemplary embodiment, effective temperature stabilization of a methane silicon photonic sensor was demonstrated, and significant reduction in fringe noise/drift was clearly observed.

Optical fringing due to Fabry-Perot etalons is present in most optical spectroscopic systems, especially those using coherent laser sources. In the case of integrated photonic sensors, stochastic line-edge roughness and other fabrication imperfections cause numerous scattering sources within the waveguide leading to interference fringes. Compounded by the high thermo-optic coefficient for silicon photonics, small temperature fluctuations can severely compromise the stability of these spectrometers. Therefore, fringe suppression through elimination of scattering effects or fringe mitigation through signal processing is a challenging but critical task for integrated optical sensors. So far, fringe mitigation techniques for integrated photonic sensors have focused on spectral signal post-processing. One of the approaches was to create a heuristic model that approximates etalon drifts to allow correction of the baseline. For some applications, where spectral baseline calibration is frequently performed, software approaches can be effective and convenient solutions. Otherwise, these empirical models may also lead to spectroscopic artifacts.

The disclosed approach directly addresses the main cause of fringe noise caused by etalon drift due to thermal fluctuations, turning a source of noise into a resource by leveraging the sensitivity of parasitic fringes to temperature change. Many studies have shown that specially-designed integrated Fabry-Perot interferometers can be used as sensitive temperature or refractive index change sensors. Etalon fringes arising from waveguide imperfections, while undesirable from a spectroscopy point of view, conveniently serve as in situ waveguide temperature sensors without additional modification of the photonic system. If conventional temperature stabilization is enhanced through more accurate waveguide temperature retrieval based on optical fringe detection, active stabilization of the sensor chip can be performed with higher accuracy resulting in stable sensor performance even under large ambient temperature fluctuations.

A testbed employed in an exemplary embodiment is a silicon photonic waveguide absorption spectrometer (SPWAS) designed for methane sensing at 1651 nm. The sensing mechanism is based on evanescent field absorption from a 10 cm long waveguide operating in TE polarization. The SPWAS is mounted on a glass substrate to allow fiber-pigtailed input and output light coupling, which is important for stable sensor operation during thermal tuning experiments. The dynamics of silicon photonic waveguide etalon drift is dominated by thermo-optic effects. Waveguide temperature variations lead to changes in the group refractive index, which in turn changes the free spectral range (FSR) of parasitic Fabry-Perot etalons in the system. In the optical spectrum, these manifest as "drifts" of individual etalon cavity modes.

FIG. 1 shows a spectral baseline strongly contaminated with optical fringes measured from the SPWAS in the absence of methane absorption. The large spectral features corresponding to the various waveguide etalons are clearly visible.

Given a uniform density of etalon fringe pattern in the spectral domain, a convenient way to analyze a complex fringe pattern is to perform Fourier transform on the baseline spectrum, which can be efficiently calculated in MATLAB using the fast Fourier transform algorithm (FFT). Before taking the FFT, laser frequency scan calibration is performed using a fiber-coupled Mach-Zehnder interferometer and a methane reference cell. The former allows linearization of the frequency axis while the latter provides absolute frequency reference. In the Fourier domain shown in the lower panel of FIG. 1, the reciprocal axis is expressed as the effective etalon cavity length, which is inversely proportional to the FSR.

Also plotted in FIG. 1 is the Fourier transform of the methane absorption spectrum corresponding to the R4 lines near 6057.1 cm−1. Significant overlap between the more dominant etalons with larger FSR (or smaller effective cavity length) and the methane absorption signal is observed in the Fourier domain, suggesting strong crosstalk between the two signals. In other words, etalon fringes that resemble the absorption line strongly affect the accuracy of concentration retrieval. However, a dense etalon fringe pattern corresponding to longer effective cavity lengths shows minimal overlap with the methane signal as shown in the inset of FIG. 1. This high frequency component corresponding to longer etalons will be virtually unaffected by the methane signal and can be used for reliable temperature retrieval.

Considering the estimated group refractive index of 3.8 for the waveguide design, this etalon (nL=~38 cm in FIG. 1) is associated with a cavity physical length of 10 cm. Since the length of the sensing waveguide is also 10 cm, it is expected that waveguide facet reflection is the main contributor to the formation of this etalon that spans the full sensor waveguide. By tracking the phase of the FFT at this cavity length (see inset of FIG. 1), the etalon fringe drift can be precisely quantified and thereafter related to waveguide temperature change.

To confirm the validity of temperature change measurements using etalon phase tracking, for reference a fast response thermistor (VECO 43A2) is mounted on the surface of the sensor chip within 2 mm distance from the waveguide under test. Waveguide temperature tuning experiment is set up according to FIG. 2: the fiber-pigtailed SPWAS is installed on a copper plate whose temperature is controlled through a thermoelectric cooler (TEC). A convection heat sink is attached to the other side of the TEC to enhance heat dissipation.

As the sensor temperature is linearly increased by changing the temperature controller set point from 292 K to 296 K, the corresponding etalon spectral shift is clearly observed in the cascade of collected optical spectra in FIG. 3A. Using the etalon fringe component identified in FIG. 1, etalon drift in the optical frequency domain (in units of $cm^{-1}$) is extracted through FFT phase tracking. FIG. 3B demonstrates an excellent correlation between thermistor measurements and etalon drift. The slope of the linear fit to the experimental data indicates the etalon drifts with a rate of 0.364 $cm^{-1}$/K, which is consistent with 0.39 $cm^{-1}$/K calculated using the thermo-optic coefficient of $2.5\times10^{-4}K^{-1}$ estimated for our waveguide structure.

To demonstrate robust temperature retrieval in the presence of strong methane absorption, the temperature controlled SPWAS is enclosed in a sealed flow chamber under constant pressure (750 Torr) and flow rate (150 sccm). A gas dilution system (Environics) is used to mix methane with nitrogen. Methane concentration is incremented by 4% in three steps starting with zero-gas purge (house nitrogen), and the expected methane concentrations are labeled on FIG. 4. Throughout the 450-second-long acquisition, the chip temperature is stabilized with a TEC controller using the thermistor for chip temperature measurement. As shown by the thermistor retrieval on FIG. 4, the PID control maintains the thermistor temperature around its set point, although sudden changes in methane concentration cause temperature disturbances because methane delivered from a compressed cylinder has a slightly different temperature (e.g. due to expansion cooling) compared to house nitrogen. These fast oscillations in chip temperature measured with the thermistor are fully damped by the PID and a stable thermistor temperature can be restored by the system. The same temperature oscillations are observed on the etalon retrieval trace, and additionally a continuous temperature increase is revealed. Despite the abrupt concentration increments and the return to 0% methane after 400 seconds, no discontinuities in the steady linear etalon drift were noted. Hence, it is seen that the selected etalon indeed provides temperature measurements free of spectral methane interference and the continuous temperature rise shown in FIG. 4 is reflective of the actual temperature of the waveguide.

The discrepancy observed in FIG. 4 between the slowly increasing etalon-retrieved temperature and the stabilized thermistor measurement indicates that the actual waveguide temperature is not properly captured by the thermistor that is located 2 mm away on the surface of the chip. In fact, given the estimated 2 dB/cm waveguide propagation loss, light energy thermalization within the waveguide material is expected to cause a steady thermal drift before reaching thermal equilibrium of the system. Therefore, temperature stabilization based on thermistor measurements does not properly address the actual waveguide temperature instability.

Nominally, the thermistor reading is performed with 1 mK resolution limited by the temperature controller. A closer look at the zoomed-in view of the first 100 s acquisition in FIG. 4 reveals much finer (>20× better) temperature resolution provided by the etalon phase tracking even though the etalon selected in FIG. 1 has a relatively small amplitude. This is not surprising, however, as tracking the phase of an isolated etalon has a similar advantage as lock-in detection, where detection is shifted to a less noisy region and a small noise bandwidth is used in the measurement to improve signal-to-noise ratio.

It should be noted that a distinct advantage of integrated sensors compared to free-space optics-based spectrometers is their compact architecture. As an example, in the exemplary SPWAS design, the 10-cm waveguide is coiled into an area of ~1 mm×1 mm. Although many scattering centers are simultaneously present along the waveguide (as the complex etalon fringe pattern in FIG. 1 clearly shows), it is reasonable to assume that temperature is quite uniform across such a small area. Therefore, by controlling the waveguide temperature directly, etalon fringes induced by different scattering centers can be altogether addressed.

Given these observations, it is understood that integrated silicon photonic sensors provide a distinct spectroscopic platform that can take advantage of more precise and accurate thermal management using non-interfering waveguide etalons. An exemplary implementation of waveguide temperature stabilization is illustrated in FIG. 2, where the disclosed approach (indicated with red arrows in the figure) is augmented to the existing temperature control setup. An adaptive PID control was implemented by introducing variable set-point to the standard temperature control based on the analog thermistor measurement. The difference between temperature measurements performed through the MATLAB-based etalon phase tracking algorithm and the conventional thermistor is determined by a control computer. The TEC set-point is continuously adjusted to stabilize the SPWAS temperature based on the more accurate etalon-phase retrieval.

With laser frequency scanned across the target transition at a rate of 1 kHz, the acquisition of each spectrum requires 1 ms. Given that the observed waveguide temperature fluctuations are slower than 1 s and that the thermistor used here has a response time of 1 s, each etalon drift measurement is extracted from the average of 100 consecutive spectra, leading to a time resolution of 0.1 s. Ultimately, the time resolution can be determined by the rate at which the laser frequency is scanned, which can easily reach sub-millisecond time resolution with scan rates of 10 s of kHz. Note that since FFT algorithms are well-optimized for speed, etalon drift retrieval is simple and fast to perform and therefore its computational time is neglected here.

FIG. 5 shows a comparison of two stabilization schemes implemented in the exemplary setup. FIG. 5(a) shows the conventional temperature stabilization method using only the thermistor reading. While the thermistor reading is stabilized by active PID control, etalon phase retrieval reveals in fact continuous rise in waveguide temperature. Case b shown in FIG. 5(b) demonstrates the improved stabilization scheme where the etalon-phase retrieved temperature is being stabilized. In this case, the thermistor temperature appears to drift due to mismatched thermal response between the waveguide and the thermistor.

To evaluate the effect of waveguide temperature stabilization on the spectroscopic baseline drift (having a direct impact on sensing performance), spectroscopic retrievals of methane concentration for both temperature stabilization methods were performed. A constant flow of a zero-gas (nitrogen) was delivered to the system and, after initial baseline correction, a continuous spectroscopic retrieval of methane gas concentration was performed. The Allan deviation plots calculated for concentration time traces collected with both stabilization methods are shown in FIG. 5(c). It is evident that through effective fringe stabilization using the proposed etalon-phase based method, baseline drift is strongly suppressed and the long-term performance of the integrated spectrometer is improved. For etalon-phase based temperature stabilization, Gaussian-noise limited performance is observed between the integration time of 10 s to 500 s, while the thermistor stabilized system becomes affected by drift after ~20 s of integration. The initial hump near 10 s integration time visible in both cases is related to suboptimal thermal contact between the copper plate and the sensor chip mounted on a glass substrate, which introduced some time lag in the system and prevented achieving optimal PID tuning. The thermal contact can be improved with careful engineering and is expected to be resolved in a fully integrated version of the sensor.

These experimental results confirm that despite fabrication imperfections, integrated sensors can achieve long-term stability (1000 s has been demonstrated in FIG. 5(c)) through active temperature stabilization of the actual waveguide temperature. Due to the compact size, temperature control can be efficiently performed without significant power consumption. While the setup shown in FIG. 2 includes a dedicated TEC controller (Arroyo 5305) and a carefully positioned thermistor, the method and system disclosed herein can be implemented simply using the inherent etalon phase measurement as temperature readout. Thermal control can be further simplified, for example, using a digital PID controller and a digital-to-analog converter to generate the correction signals for heating/cooling. The disclosed approach allows for economical yet robust integrated spectrometers.

The disclosed process can be performed according to the diagram shown in FIG. 6. The spectrometer (DUT) obtains the transmission spectrum, and the signal processor extracts the etalon drift from the spectral signatures of parasitic fringes. The extracted etalon drift then serves as the error signal to a controller, which controls the actuator (e.g., heaters for temperature control, piezo-elements for strain or position control, or gas valves for pressure control) that provides feedback to the DUT. One can test and/or control some or all of the spectrometer. For example, as shown in two exemplary embodiments: 1) the entire system can be treated as the DUT (FIG. 6(a) or alternatively 2) a component or a sub-system of the spectrometer that causes fringe instabilities can be controlled as DUT (FIG. 6(b)).

An exemplary implementation of a sub-system control (FIG. 6(b)) is disclosed here using a spectrometer system based on integrated silicon photonic waveguide spectrometer. In the first implementation of the DUT, the control loop (FIG. 7(a)) leverages a conventional temperature stabilization using a thermistor augmented with additional adaptive correction to the set-point based on etalon fringe drift. This allows the conventional system to be minimally altered. The standard setup for tunable diode laser absorption spectroscopy (TDLAS) is adopted here: a single-mode laser is scanned across a spectral region to target certain transitions of interest, and the detector signal captures the optical transmission spectrum of the transitions as well as parasitic fringes in the system. The detector signal is digitized, and a control computer is used to process the obtained transmission spectrum. The frequency scanning of the laser is usually calibrated so that the precise frequency axis is known. Note that frequency axis linearization is critical for this application since any remaining frequency nonlinearity leads to inaccurate etalon phase detection. The etalon drift can be retrieved based on the phase of the Fourier transformed transmission signal, such as the one explained in, by direct fitting of the suspected etalon spectrum, or by any other method that can extract frequency drift of the etalon. For simplicity, the temperature retrieved from the phase of an etalon is hereafter called the equivalent etalon temperature, which in most cases also represents the actual temperature of the DUT. As FIG. 6(a) shows, an adaptive PID control is created by introducing variable set-point to the standard temperature control setup based on the analog thermistor measurement. Since the thermistor measurement does not represent the actual temperature of the spectrometer, one can calculate the difference between the thermistor temperature and equivalent etalon temperature after etalon phase retrieval with the signal processor (in this case a control computer), then adjust the temperature controller's set-point continuously to ensure the etalon phase is being stabilized (and thus etalon drift is suppressed).

Figure 7B:
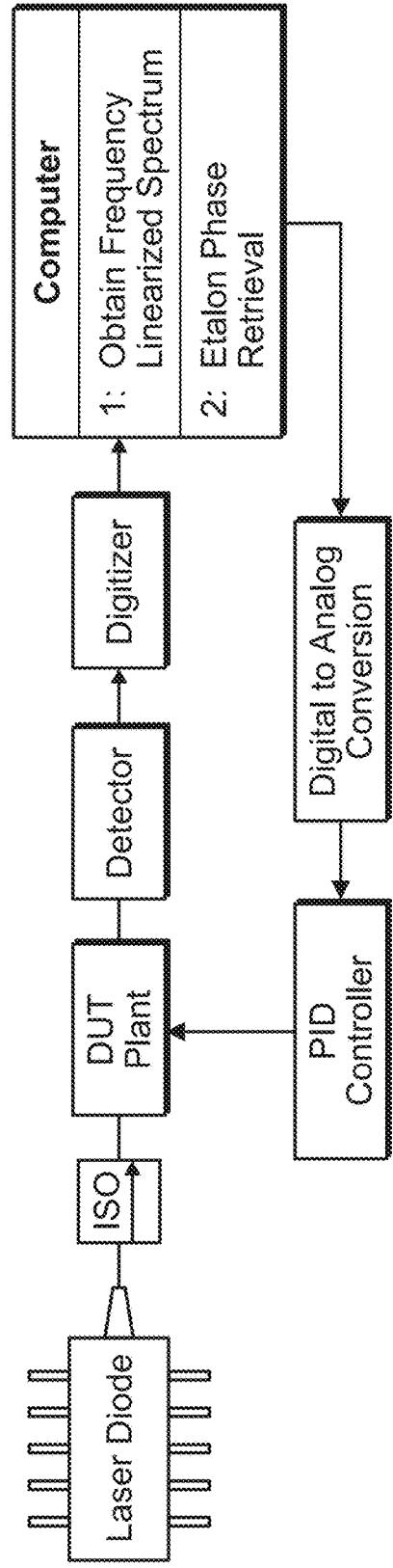
FIG. 7B depicts an implementation of fringe stabilization based on etalon phase retrieval wherein the etalon drift measurement is directly used as the error signal and a secondary parameter sensor is not required.

In the second and more general implementation (FIG. 7(b)), the etalon drift measurement is directly used as the error signal and the secondary parameter sensor is not required. As fringe movement can be precisely quantified through etalon phase measurement, the phase retrieval is converted into an analog error signal for the PID controller. Here the PID controller can act on either the temperature of the DUT or control any other actuator that allows etalon cavity length adjustments (e.g., piezoelectric element).

More generally, the disclosed system and method controls a parameter (such as a temperature, a pressure, an opto-mechanical position, an electrical current or an optical power) by receiving a transmission spectrum originating from a sample illuminated by a light source (the transmission spectrum comprising spectral signatures of the sample and parasitic optical fringes); extracting a drift of parasitic optical fringes in an optical frequency domain from the transmission spectrum; controlling an actuator based on the extracted drift of parasitic optical fringes (where the actuator is configured to control a parameter capable of stabilizing the drift of parasitic optical fringes observed in the transmission spectrum); and repeating these steps. Extracting the drift of the parasitic optical fringes from the transmission spectrum may comprise extracting the drift of the parasitic optical fringes in an optical frequency domain through Fourier transform of the transmission spectrum followed by phase retrieval. The system and method may compare the extracted drift of the parasitic optical fringe to a measured parameter (e.g., temperature, pressure, opto-mechanical position, electrical current or optical power), the measured parameter relating to the parameter to be controlled. Extracting the drift of the parasitic optical fringes from the transmission spectrum may comprise fitting of the fringes by an etalon spectrum with an appropriate shift parameter, and may comprise extracting drift of an etalon in a spectral domain, e.g., by utilizing a signal processing algorithm in a time- or a Fourier-domain.

While the disclosed methodology is generally applicable to optical spectrometers, its efficacy depends on the ability to 1) identify the optical component(s) responsible for the etalon(s) and 2) perform effective control of the etalon(s). In the case of integrated photonic sensors, the compact chip-scale design allows simplified application of the disclosed process by directly implementing thermal control to the spectrometer photonic integrated chip. For free-space-optics spectrometers, however, many standalone optical elements such as lenses and windows may be present, and the spectrometer setup may span an extended area. This challenge can be addressed by either enclosing the entire system into a controlled enclosure (e.g., with temperature control or pressure control), or by identifying the optical elements that are directly responsible for the etalons that would allow targeted thermal management or mechanical control. The culprit can be identified, for example, by inducing some temperature change or movement on specific optical elements and observe whether the corresponding etalons drift.

The disclosed approach has been applied to a silicon photonic waveguide absorption methane sensor. Experimental confirmation was obtained by implementing the setup shown in FIG. 7(a) that lead to improved precision of the optical spectrometer affected by parasitic fringes. FIG. 5(c) shows a comparison of two stabilization schemes implemented with the disclosed setup. In the conventional temperature stabilization scheme, only the thermistor reading is used for PID feedback control. With the disclosed approach, the etalon phase retrieval is used to augment temperature measurement according to FIG. 7(a).

The disclosed approach can be applied in all cases where optical fringing is an issue. For example, it can be readily applied to any tunable laser absorption gas sensing systems, and can be easily implemented on integrated sensing platforms as has been experimentally shown. Multi-pass cells used for free-space-optics spectrometers can also benefit from this technology as optical fringing is prevalent due to mirror scattering or cell window reflections. Advantages over existing fringe mitigation techniques have been elaborated above.

Embodiments of the present disclosure are described in detail with reference to the figures wherein like reference numerals identify similar or identical elements. It is to be understood that the disclosed embodiments are merely examples of the disclosure, which may be embodied in various forms. Well known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Those skilled in the art will recognize or be able to ascertain using no more than routine experimentation many equivalents to the specific embodiments of the invention described herein. Such equivalents are intended to be encompassed by the following claims.

What is claimed is:
1. A control system, comprising:
a signal processor subsystem configured to receive a transmission spectrum of a sample illuminated by a light source, the transmission spectrum comprising spectral signatures of the sample and parasitic optical fringes; and circuitry configured to:
extract a drift of the parasitic optical fringes from the transmission spectrum in real-time; and
control an actuator based on the drift of the parasitic optical fringes, where the actuator is configured to control a parameter capable of stabilizing the drift of the parasitic optical fringes observed in the transmission spectrum.

2. The control system according to claim 1, wherein the circuitry comprises one or more signal processors.

3. The control system according to claim 1, wherein the light source is a coherent laser source.

4. The control system according to claim 3, wherein the light source is a laser diode.

5. The control system according to claim 1, wherein the light source is a subsystem of a spectrometer.

6. The control system according to claim 5, wherein the spectrometer is a silicon photonic waveguide absorption spectrometer (SPWAS).

7. The control system according to claim 5, wherein the spectrometer is a free-space optics absorption spectrometer.

8. The control system according to claim 5, wherein the spectrometer is enclosed in a pressure-controlled vessel.

9. The control system according to claim 8, wherein the actuator is configured to control the pressure inside the vessel.

10. The control system according to claim 5, wherein the drift of the parasitic optical fringes in the spectrometer can be controlled by an opto-mechanical, electrical or optical means.

11. The control system according to claim 1, wherein the actuator is configured to control a temperature.

12. The control system according to claim 11, wherein the actuator is operably coupled to one or more heating units.

13. The control system according to claim 11, wherein the actuator is operably coupled to one or more cooling units.

14. The control system according to claim 1, wherein the circuitry is further configured to obtain a frequency linearized spectrum.

15. The control system according to claim 14, wherein extracting the drift of the parasitic optical fringes from the transmission spectrum comprises extracting the drift of the parasitic optical fringes in an optical frequency domain through Fourier transform of the transmission spectrum followed by phase retrieval.

16. The control system according to claim 15, wherein the circuitry is further configured to compare the extracted drift of the parasitic optical fringe to a measured parameter, the measured parameter relating to the parameter to be controlled.

17. The control system according to claim 16, wherein the measured parameter is temperature, pressure, opto-mechanical position, electrical current or optical power.

18. The control system according to claim 14, wherein extracting the drift of the parasitic optical fringes from the transmission spectrum comprises fitting of the fringes by an etalon spectrum with an appropriate shift parameter.

19. The control system according to claim 14, wherein extracting the drift of the parasitic optical fringes from the transmission spectrum comprises extracting drift of an etalon in a spectral domain.

20. The control system according to claim 19, wherein extracting drift on the etalon in the spectral domain includes utilizing a signal processing algorithm in a time- or a Fourier-domain.

21. A method for controlling a parameter, comprising:
receiving a transmission spectrum originating from a sample illuminated by a light source, the transmission spectrum comprising spectral signatures of the sample and parasitic optical fringes;
extracting a drift of parasitic optical fringes in an optical frequency domain from the transmission spectrum;
controlling an actuator based on the extracted drift of parasitic optical fringes, where the actuator is configured to control a parameter capable of stabilizing the drift of parasitic optical fringes observed in the transmission spectrum; and
repeating the receiving, extracting, and controlling steps.

22. The method according to claim 21, wherein the parameter is a temperature, a pressure, an opto-mechanical position, an electrical current or an optical power.

23. The method according to claim 21, further comprising calibrating a relationship between the parasitic optical fringe drift and the parameter, where calibrating includes obtaining a frequency linearized spectrum.

24. The method according to claim 23, wherein extracting the parasitic optical fringe drift from the transmission spectrum comprises extracting the parasitic optical fringe drift in an optical frequency domain through Fourier transform of the transmission spectrum followed by phase retrieval.

25. The method according to claim 24, further comprising comparing the parasitic optical fringe drift to a measured parameter, the measured parameter relating to the parameter to be controlled.

26. The method according to claim 23, wherein extracting the drift of parasitic optical fringes from the transmission spectrum comprises fitting of the fringes by an etalon spectrum with an appropriate shift parameter.

27. The method according to claim 23, wherein extracting the drift of parasitic optical fringes from the transmission spectrum is based on any other method that can extract drift of an etalon in spectral domain including but not limited to signal processing algorithms in time- or Fourier-domain.

* * * * *